US011655390B2

(12) United States Patent
Oosaki et al.

(10) Patent No.: US 11,655,390 B2
(45) Date of Patent: May 23, 2023

(54) COATING FLUID

(71) Applicant: SUMITOMO CHEMICAL COMPANY, LIMITED, Tokyo (JP)

(72) Inventors: Nobuhiro Oosaki, Tokyo (JP); Mizuki Sato, Osaka (JP); Daisuke Shibata, Osaka (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 465 days.

(21) Appl. No.: 16/754,219

(22) PCT Filed: Nov. 5, 2018

(86) PCT No.: PCT/JP2018/040946
§ 371 (c)(1),
(2) Date: Apr. 7, 2020

(87) PCT Pub. No.: WO2019/093260
PCT Pub. Date: May 16, 2019

(65) Prior Publication Data
US 2020/0270476 A1    Aug. 27, 2020

(30) Foreign Application Priority Data

Nov. 7, 2017   (JP) .............................. JP2017-215033

(51) Int. Cl.
*C09D 7/61* (2018.01)
*C09D 139/02* (2006.01)
*C09D 129/04* (2006.01)
*C08J 7/048* (2020.01)
*C08K 3/34* (2006.01)
*C09D 7/40* (2018.01)

(52) U.S. Cl.
CPC ............ *C09D 139/02* (2013.01); *C08J 7/048* (2020.01); *C09D 7/61* (2018.01); *C09D 7/66* (2018.01); *C09D 129/04* (2013.01); *C08J 2367/00* (2013.01); *C08J 2429/04* (2013.01); *C08J 2439/02* (2013.01)

(58) Field of Classification Search
CPC ...... C09D 7/61; C09D 139/02; C09D 129/04; C08K 3/346
See application file for complete search history.

(56) References Cited

U.S. PATENT DOCUMENTS

| | | | |
|---|---|---|---|
| 5,776,618 A | 7/1998 | Lu | |
| 7,892,615 B2 | 2/2011 | Matsuoka et al. | |
| 10,189,919 B2 | 1/2019 | Khan | |
| 10,392,527 B2 | 8/2019 | Khan et al. | |
| 2007/0212631 A1 | 9/2007 | Abe et al. | |
| 2011/0159308 A1 | 6/2011 | Brondsema et al. | |

FOREIGN PATENT DOCUMENTS

| | | | | |
|---|---|---|---|---|
| CN | 1226202 A | | 8/1999 | |
| CN | 101401041 A | | 4/2009 | |
| JP | 2000-505836 A | | 5/2000 | |
| JP | 2000-309607 A | | 11/2000 | |
| JP | 2005-220154 A | | 8/2005 | |
| JP | 2005225140 A | * | 8/2005 | |
| JP | 2006-176758 A | | 7/2006 | |
| JP | 2012-502163 A | | 1/2012 | |
| JP | 2013-203414 A | | 10/2013 | |
| JP | 2015-036215 A | | 2/2015 | |
| JP | 2016-514181 A | | 5/2016 | |
| JP | 2016-520146 A | | 7/2016 | |
| WO | WO-2010030371 A1 | * | 3/2010 | ........... C08J 5/18 |

OTHER PUBLICATIONS

International Searching Authority, "International Search Report," issued in connection with International Patent Application No. PCT/JP2018/040946, dated Dec. 18, 2018.
International Searching Authority, "Written Opinion," issued in connection with International Patent Application No. PCT/JP2018/040946, dated Dec. 18, 2018.
Office Action dated Apr. 30, 2021 issued in a corresponding Chinese Patent Application No. 201880070163.3, (13 pages).
Extended European Search Report issued in corresponding European Patent Application No. 18876453.4, dated Jul. 2, 2021.
Office Action issued in corresponding Indian Patent Application No. 202047022944, dated Jan. 11, 2021.

* cited by examiner

*Primary Examiner* — Vu A Nguyen
(74) *Attorney, Agent, or Firm* — Foley & Lardner LLP

(57) ABSTRACT

The present invention provides a coating fluid including: a hydroxy group-containing resin; an inorganic layered compound; and a liquid medium, in which a ratio (outflow time (B)/outflow time (A)) of outflow time (B) of a coating fluid at 5° C. measured by a Zahn cup to outflow time (A) of a coating fluid at 24° C. measured by a Zahn cup is 1.40 or less.

19 Claims, No Drawings

COATING FLUID

CROSS-REFERENCE TO RELATED APPLICATIONS

The present application claims priority under 37 U.S.C. § 371 to International Patent Application No. PCT/JP2018/040946, filed Nov. 5, 2018, which claims priority to and the benefit of Japanese Patent Application No. 2017-215033, filed on Nov. 7, 2017. The contents of these applications are hereby incorporated by reference in their entireties.

TECHNICAL FIELD

The present invention relates to a coating fluid.

BACKGROUND ART

For example, packaging materials for foods and cosmetics or the like require low oxygen permeability in order to prevent oxidization thereof. A laminate including a gas barrier layer made of polyvinyl alcohol or the derivative thereof, the gas barrier layer being formed on a substrate, has been known as a packaging material with low oxygen permeability. Herein, the "gas barrier layer" refers to a layer used for suppressing permeation of gas (for example, oxygen).

For example, Patent Document 1 describes that a gas barrier layer is formed from a dispersion containing polyvinyl alcohol, montmorillonite, water, isopropanol, and butanol. In addition, Patent Document 2 describes a barrier layer containing a polyvinyl amine-polyvinyl alcohol copolymer.

PRIOR ART DOCUMENTS

Patent Documents

Patent Document 1: JP-A-2005-220154
Patent Document 2: JP-A-2012-502163

SUMMARY OF THE INVENTION

Problems to be Solved by the Invention

A gas barrier layer formed using polyvinyl alcohol exhibits low oxygen permeability under low humidity, but has a problem that oxygen permeability increases under high humidity. The present invention is conceived focusing on such a problem, and an object of the present invention is to provide a coating fluid capable of forming a gas barrier layer exhibiting low oxygen permeability under high humidity.

Means for Solving the Problems

The present invention that can achieve the above-described object is as follows.

[1] A coating fluid, including: a hydroxy group-containing resin; an inorganic layered compound; and a liquid medium, in which a ratio (outflow time (B)/outflow time (A)) of outflow time (B) of a coating fluid at 5° C. measured by a Zahn cup to outflow time (A) of a coating fluid at 24° C. measured by a Zahn cup is 1.40 or less.

[2] The coating fluid according to (1) above, in which the outflow time (B)/outflow time (A) is 1.35 or less.

[3] The coating fluid according to (1) above, in which the outflow time (B)/outflow time (A) is 1.30 or less.

[4] The coating fluid according to (1) above, in which the outflow time (B)/outflow time (A) is 1.25 or less.

[5] The coating fluid according to (1) above, in which the outflow time (B)/outflow time (A) is 1.20 or less.

[6] The coating fluid according to any one of [1] to [5] above, in which the outflow time (B)/outflow time (A) is 0.90 or more.

[7] The coating fluid according to any one of [1] to [5] above, in which the outflow time (B)/outflow time (A) is 0.95 or more.

[8] The coating fluid according to any one of [1] to [7] above, in which the outflow time (A) is 9 to 80 seconds.

[9] The coating fluid according to any one of [1] to [7] above, in which the outflow time (A) is 9 to 30 seconds.

[10] The coating fluid according to any one of [1] to [7] above, in which the outflow time (A) is 9 to 15 seconds.

[11] The coating fluid according to any one of [1] to [7] above, in which the outflow time (A) is 9 to 13 seconds.

[12] The coating fluid according to any one of [1] to [11] above, in which an amount of a hydroxy group per 100 g of the hydroxy group-containing resin is 1.50 to 2.27 mol.

[13] The coating fluid according to [12] above, in which the amount of the hydroxy group is 1.55 to 2.20 mol.

[14] The coating fluid according to [12] above, in which the amount of the hydroxy group is 1.60 to 2.10 mol.

[15] The coating fluid according to any one of [1] to [14] above, in which the hydroxy group-containing resin further has an amino group.

[16] The coating fluid according to [15] above, in which an amount of the amino group per 100 g of the hydroxy group-containing resin is 0.046 to 0.682 mol.

[17] The coating fluid according to [16] above, in which the amount of the amino group is 0.060 to 0.50 mol.

[18] The coating fluid according to [16] above, in which the amount of the amino group is 0.10 to 0.30 mol.

[19] The coating fluid according to any one of [1] to [18] above, in which a number average molecular weight of the hydroxy group-containing resin is 10,000 to 50,000.

[20] The coating fluid according to any one of [1] to [18] above, in which the number average molecular weight of the hydroxy group-containing resin is 12,000 to 40,000.

[21] The coating fluid according to any one of [1] to [18] above, in which the number average molecular weight of the hydroxy group-containing resin is 15,000 to 30,000.

[22] The coating fluid according to any one of [1] to [21] above, in which the hydroxy group-containing resin is a vinyl amine-vinyl alcohol copolymer.

[23] The coating fluid according to [22] above, in which a degree of saponification of the vinyl amine-vinyl alcohol copolymer is 80 to 100%.

[24] The coating fluid according to [22] above, in which a degree of saponification of the vinyl amine-vinyl alcohol copolymer is 90 to 100%.

[25] The coating fluid according to [22] above, in which a degree of saponification of the vinyl amine-vinyl alcohol copolymer is 95 to 100%.

[26] The coating fluid according to any one of [1] to [25] above, in which a content of the hydroxy group-containing resin is 0.2% by mass or more per 100% by mass of the coating fluid.

[27] The coating fluid according to any one of [1] to [25] above, in which a content of the hydroxy group-containing resin is 0.4% by mass or more per 100% by mass of the coating fluid.

[28] The coating fluid according to any one of [1] to [25] above, in which a content of the hydroxy group-containing resin is 0.5% by mass or more per 100% by mass of the coating fluid.

[29] The coating fluid according to any one of [1] to [25] above, in which a content of the hydroxy group-containing resin is 1.0% by mass or more per 100% by mass of the coating fluid.

[30] The coating fluid according to any one of [1] to [25] above, in which a content of the hydroxy group-containing resin is 2.0% by mass or more per 100% by mass of the coating fluid.

[31] The coating fluid according to any one of [1] to [30] above, in which a content of the hydroxy group-containing resin is 9.05% by mass or less per 100% by mass of the coating fluid.

[32] The coating fluid according to any one of [1] to [30] above, in which a content of the hydroxy group-containing resin is 8.0% by mass or less per 100% by mass of the coating fluid.

[33] The coating fluid according to any one of [1] to [30] above, in which a content of the hydroxy group-containing resin is 6.0% by mass or less per 100% by mass of the coating fluid.

[34] The coating fluid according to any one of [1] to [30] above, in which a content of the hydroxy group-containing resin is 5.5% by mass or less per 100% by mass of the coating fluid.

[35] The coating fluid according to any one of [1] to [30] above, in which a content of the hydroxy group-containing resin is 4.0% by mass or less per 100% by mass of the coating fluid.

[36] The coating fluid according to any one of [1] to [35] above, in which the liquid medium contains water and liquid organic medium.

[37] The coating fluid according to [36] above, in which the liquid organic medium is at least one selected from the group consisting of monovalent alcohol, glycol, dimethylformamide, dimethyl sulfoxide, and acetone.

[38] The coating fluid according to [37] above, in which the monovalent alcohol is at least one selected from the group consisting of methanol, ethanol, propanol, isopropanol, and butanol.

[39] The coating fluid according to any one of [1] to [35] above, in which the liquid medium contains water and ethanol.

[40] The coating fluid according to [39] above, in which a content of the ethanol is 1 to 70% by mass per 100% by mass of the total of water and ethanol.

[41] The coating fluid according to [39] above, in which a content of ethanol is 5 to 60% by mass per 100% by mass of the total of water and ethanol.

[42] The coating fluid according to [39] above, in which a content of the ethanol is 10 to 50% by mass per 100% by mass of the total of water and ethanol.

[43] The coating fluid according to any one of [1] to [27] and [31] to [42] above, in which a content of the liquid medium is 90 to 99.5% by mass per 100% by mass of the coating fluid.

[44] The coating fluid according to any one of [1] to [28] and [31] to [42] above, in which a content of the liquid medium is 91 to 99% by mass per 100% by mass of the coating fluid.

[45] The coating fluid according to any one of [1] to [29] and [31] to [42] above, in which a content of the liquid medium is 92 to 98% by mass per 100% by mass of the coating fluid.

[46] The coating fluid according to any one of [1] to [45] above, in which an average particle size of the inorganic layered compound in the coating fluid is 0.02 to 3 μm.

[47] The coating fluid according to [46] above, in which the average particle size is 0.1 to 2 μm.

[48] The coating fluid according to [46] above, in which the average particle size is 0.2 to 1 μm.

[49] The coating fluid according to any one of [1] to [48] above, in which a ratio (L/a) of an average particle size L of the inorganic layered compound in the coating fluid to a thickness of a unit crystal layer of the inorganic layered compound measured by powder X-ray diffraction method is 20 to 3,000.

[50] The coating fluid according to [49] above, in which the ratio (L/a) is 100 to 2,000.

[51] The coating fluid according to [49] above, in which the ratio (L/a) is 200 to 1,000.

[52] The coating fluid according to any one of [1] to [51] above, in which the inorganic layered compound is a clay mineral.

[53] The coating fluid according to [52] above, in which the clay mineral is at least one selected from the group consisting of kaolinite, dickite, nakhlite, halloysite, antigorite, chrysotile, pyrophyllite, montmorillonite, beidellite, nontronite, saponite, sauconite, stevensite, hectorite, tetrasilic mica, sodium taeniolite, muscovite, margarite, talc, vermiculite, phlogopite, xanthophyllite, chlorite, and hydrotalcite.

[54] The coating fluid according to any one of [1] to [51] above, in which the inorganic layered compound is a smectite clay mineral.

[55] The coating fluid according to [54] above, in which the smectite clay mineral is at least one selected from the group consisting of montmorillonite, beidellite, nontronite, saponite, sauconite, stevensite, and hectorite.

[56] The coating fluid according to any one of [1] to [51] above, in which the inorganic layered compound is montmorillonite.

[57] The coating fluid according to any one of [1] to [56] above, in which a content of the inorganic layered compound is 0.047% by mass or more per 100% by mass of the coating fluid.

[58] The coating fluid according to any one of [1] to [56] above, in which a content of the inorganic layered compound is 0.050% by mass or more per 100% by mass of the coating fluid.

[59] The coating fluid according to any one of [1] to [56] above, in which a content of the inorganic layered compound is 0.10% by mass or more per 100% by mass of the coating fluid.

[60] The coating fluid according to any one of [1] to [56] above, in which a content of the inorganic layered compound is 0.20% by mass or more per 100% by mass of the coating fluid.

[61] The coating fluid according to any one of [1] to [42] and [45] to [56] above, in which a content of the inorganic layered compound is 1.0% by mass or more per 100% by mass of the coating fluid.

[62] The coating fluid according to any one of [1] to [61] above, in which a content of the inorganic layered compound is 6.0% by mass or less per 100% by mass of the coating fluid.

[63] The coating fluid according to any one of [1] to [61] above, in which a content of the inorganic layered compound is 5.5% by mass or less per 100% by mass of the coating fluid.

[64] The coating fluid according to any one of [1] to [61] above, in which a content of the inorganic layered compound is 5.0% by mass or less per 100% by mass of the coating fluid.

[65] The coating fluid according to any one of [1] to [61] above, in which a content of the inorganic layered compound is 4.5% by mass or less per 100% by mass of the coating fluid.

[66] The coating fluid according to any one of [1] to [61] above, in which a content of the inorganic layered compound is 4.4% by mass or less per 100% by mass of the coating fluid.

[67] The coating fluid according to any one of [1] to [61] above, in which a content of the inorganic layered compound is 4.0% by mass or less per 100% by mass of the coating fluid.

Effect of the Invention

According to the coating fluid of the present invention, a gas barrier layer exhibiting low oxygen permeability under high humidity can be formed.

MODE FOR CARRYING OUT THE INVENTION

Hereinafter, the characteristics of the coating fluid of the present invention, respective components that can be used in the present invention, or the like will be described in order. Note that examples and preferred descriptions and the like described later can be combined as long as there are no mutual inconsistencies.

Outflow Time of Coating Fluid Measured by Zahn Cup

One of the features of the present invention lies in that the ratio (outflow time (B)/outflow time (A)) of outflow time (B) of a coating fluid at 5° C. measured by a Zahn cup to outflow time (A) of a coating fluid at 24° C. measured by a Zahn cup is 1.40 or less. The outflow time of a coating fluid measured by a Zahn cup is an indicator relating to the viscosity of a coating fluid. A smaller outflow time (B)/outflow time (A) indicates lower temperature dependency of the outflow time, that is, less temperature dependency of the viscosity. In the present invention, the outflow time (A) and outflow time (B) of the coating fluid (unit: second) are each values measured using a Zahn cup under the conditions of Examples described later.

The coating fluid of the present invention is applied to a substrate or the like, after which a liquid medium is removed by drying, thus forming a coating film. Examples of drying include heat drying, drying by non-heating means such as decompression, and drying by a combination thereof. Heat drying is often employed from the viewpoint of simplicity of an apparatus. In heat drying, the temperature of the coating fluid applied to the substrate or the like changes. It is assumed that a higher temperature dependency of the viscosity causes non-uniform viscosity during heat drying, resulting in a non-uniform coating film with high oxygen permeability. Meanwhile, it is assumed that the coating fluid of the present invention, having less temperature dependency of the viscosity, is less likely to cause non-uniform viscosity even in heat drying, thus resulting in a uniform coating film with low oxygen permeability. However, the present invention is not limited to such an assumption.

From the viewpoint of low oxygen permeability and film formability, the outflow time (B)/outflow time (A) is preferably 1.35 or less, more preferably 1.30 or less, even more preferably 1.25 or less, and particularly preferably 1.20 or less. The outflow time (B)/outflow time (A) is preferably 0.90 or more, and more preferably 0.95 or more.

From the viewpoint of low oxygen permeability and suppression of uneven application of the coating fluid, the outflow time (A) of the coating fluid at 24° C. measured by a Zahn cup is preferably 9 to 80 seconds, more preferably 9 to 30 seconds, even more preferably 9 to 15 seconds, and particularly preferably 9 to 13 seconds.

The requirement of "outflow time (B)/outflow time (A)≤1.40" can be satisfied by using a vinylamine-vinylalcohol copolymer as a hydroxy group-containing resin, using a mixture of water and ethanol as a liquid medium, and adjusting the content of ethanol as described in Examples 1 and 2 later, for example; however, the requirement can also be achieved by other materials and/or conditions.

Hydroxy Group-Containing Resin

The coating fluid of the present invention contains a hydroxy group-containing resin. One type of hydroxy group-containing resin may be used alone, or two or more types thereof may be used.

The hydroxy group-containing resin may be a homopolymer or a copolymer. The copolymer may be any of a block copolymer, an alternating copolymer, a random copolymer, and a combination thereof. Examples of the hydroxy group-containing resin include polyvinyl alcohol (PVA), a vinylamine-vinylalcohol copolymer, a (meth)acrylic acid-vinyl alcohol copolymer, ethylene-vinyl alcohol copolymer (EVOH), polysaccharides, and the derivative thereof. Herein, the "(meth)acrylic acid" refers to acrylic acid and/or methacrylic acid.

From the viewpoint of low oxygen permeability and film formability, the amount of the hydroxy group per 100 g of the hydroxy group-containing resin is preferably 1.50 to 2.27 mol, more preferably 1.55 to 2.20 mol, and even more preferably 1.60 to 2.10 mol. The amount of the hydroxy group can be measured by proton magnetic resonance spectroscopy ($^1$H NMR).

Preferably, the hydroxy group-containing resin further has an amino group in order to achieve low oxygen permeability. From the viewpoint of low oxygen permeability and adhesion of the gas barrier layer to the substrate, the amount of the amino group per 100 g of the hydroxy group-containing resin is preferably 0.046 to 0.682 mol, more preferably 0.060 to 0.50 mol, and even more preferably 0.10 to 0.30 mol. The amount of the amino group can be measured by proton magnetic resonance spectroscopy ($^1$H NMR).

From the viewpoint of low oxygen permeability as well as flexibility and film formability of the gas barrier layer, the number average molecular weight of the hydroxy group-containing resin is preferably 10,000 to 50,000, more preferably 12,000 to 40,000, and even more preferably 15,000 to 30,000. The number average molecular weight can be measured by gel permeation chromatography (GPC).

From the viewpoint of low oxygen permeability and adhesion of the gas barrier layer to the substrate, the hydroxy group-containing resin is preferably a vinyl amine-vinyl alcohol copolymer. The vinyl amine-vinyl alcohol copolymer may be any of a block copolymer, an alternating copolymer, a random copolymer, and a combination thereof. From the viewpoint of low oxygen permeability, adhesion of the gas barrier layer to the substrate, and film formability of the gas barrier layer, the vinyl amine-vinyl alcohol copolymer is preferably a random copolymer. The amount of the hydroxy group and amino group per 100 g of the vinyl amine-vinyl alcohol copolymer, and the measurement method thereof are as described above.

From the viewpoint of low oxygen permeability, as well as adhesion of the gas barrier layer to the substrate and film formability of the gas barrier layer, the degree of saponification of the vinyl amine-vinyl alcohol copolymer is preferably 80 to 100%, more preferably 90 to 100%, and even more preferably 95 to 100%. Herein, the "degree of saponification of vinyl amine-vinyl alcohol copolymer" refers to a ratio of the total of hydroxy group and amino group to the total of a "hydroxy group (—OH)" and "precursor of a hydroxy group (for example, an acetoxy group (—O—CO—CH$_3$))", as well as an "amino group (—NH$_2$)," and "precursor of an amino group (for example, a formylamino group (—NH—CHO)) that can be included in the vinyl amine-vinyl alcohol copolymer (=100× (hydroxy group+amino group)/(hydroxy group+precursor of hydroxy group+amino group+precursor of amino group)). The degree of saponification can be calculated from the amounts of acetoxy group, formylamino group, hydroxy group, and amino group, or the like that can be measured by proton magnetic resonance spectroscopy ($^1$H NMR).

From the viewpoint of low oxygen permeability, flexibility and film formability of the gas barrier layer, the content of the hydroxy group-containing resin per 100% by mass of the coating fluid is preferably 0.2% by mass or more, more preferably 0.4% by mass or more, even more preferably 0.5% by mass or more, particularly preferably 1.0% by mass or more, most preferably 2.0% by mass or more, preferably 9.05% by mass or less, more preferably 8.0% by mass or less, even more preferably 6.0% by mass or less, particularly preferably 5.5% by mass or less, and most preferably 4.0% by mass or less.

Inorganic Layered Compound

The coating fluid of the present invention contains an inorganic layered compound. One type of inorganic layered compound may be used alone, or two or more types thereof may be used.

An example of the inorganic layered compound is a clay mineral. One type of clay mineral may be used alone, or two or more types thereof may be used. Examples of the clay mineral include kaolinite, dickite, nakhlite, halloysite, antigorite, chrysotile, pyrophyllite, montmorillonite, beidellite, nontronite, saponite, sauconite, stevensite, hectorite, tetrasililic mica, sodium taeniolite, muscovite, margarite, talc, vermiculite, phlogopite, xanthophyllite, chlorite, and hydrotalcite. The clay mineral may be one whose dispersibility or the like is improved by a treatment with an organic substance (for example, ion exchange).

The inorganic layered compound is preferably a smectite clay mineral. One type of smectite clay mineral may be used alone, or two or more types thereof may be used. Examples of the smectite clay mineral include montmorillonite, beidellite, nontronite, saponite, sauconite, stevensite, and hectorite. The inorganic layered compound is more preferably montmorillonite. The smectite clay mineral (in particular, montmorillonite) may be one whose dispersibility or the like is improved by treatment with an organic substance (for example, ion exchange)

The average particle size of the inorganic layered compound in the coating fluid is preferably 0.02 to 3 μm, more preferably 0.1 to 2 μm, and even more preferably 0.2 to 1 μm. Herein, the "average particle size of the inorganic layered compound in the coating fluid" means a median size on the basis of the volume of the inorganic layered compound in the coating fluid measured using a laser diffraction/scattering particle size distribution analyzer. The average particle size can be measured as in Examples described later.

The ratio (L/a) of the average particle size L of the inorganic layered compound in the coating fluid described above to the thickness a of the unit crystal layer of the inorganic layered compound measured by powder X-ray diffraction method is preferably 20 to 3,000, more preferably 100 to 2,000, and even more preferably 200 to 1,000. The thickness a of the unit crystal layer of the inorganic layered compound and the average particle size L of the inorganic layered compound in the coating fluid can be measured as in Examples described later. Note that the inorganic layered compound means an inorganic compound having a layered crystal structure, and the thickness a of the unit crystal layer of the inorganic layered compound means the thickness of one layer of the crystal structure.

From the viewpoint of low oxygen permeability as well as flexibility and film formability of the coating film, the content of the inorganic layered compound per 100% by mass of the coating fluid is preferably 0.047% by mass or more, more preferably 0.050% by mass or more, even more preferably 0.10% by mass or more, particularly preferably 0.20% by mass or more, most preferably 1.0% by mass or more, preferably 6.0% by mass or less, more preferably 5.5% by mass or less, still more preferably 5.0% by mass or less, even more preferably 4.5% by mass or less, particularly preferably 4.4% by mass or less, and most preferably 4.0% by mass or less.

Liquid Medium

The coating fluid of the present invention contains a liquid medium. The liquid medium preferably contains water and a liquid organic medium. Herein, the "liquid medium" refers to a medium that is liquid at 25° C. and 1 atm, and the "liquid organic medium" refers to an organic compound that is liquid at 25° C. and 1 atm. One type of liquid organic medium may be used alone, or two or more types thereof may be used.

Examples of the liquid organic medium include monovalent alcohol, glycol, dimethylformamide, dimethyl sulfoxide, and acetone. Examples of the monovalent alcohol include methanol, ethanol, propanol, isopropanol, and butanol. Note that, hereinafter, the "monovalent alcohol" may be simply described as "alcohol".

The liquid medium more preferably contains water and ethanol, and is even more preferably composed of water and ethanol. From the viewpoint of stability of the coating fluid and drying time in application of the coating fluid, the content of the ethanol in the liquid medium is preferably 1 to 70% by mass, more preferably 5 to 60% by mass, and even more preferably 10 to 50% by mass per 100% by mass of the total of water and ethanol.

From the viewpoint of low oxygen permeability and film formability, the content of the liquid medium is preferably 90 to 99.5% by mass, more preferably 91 to 99% by mass, and even more preferably 92 to 98% by mass per 100% by mass of the coating fluid.

Other Components

The coating fluid of the present invention may contain other components that are different from the above-described hydroxy group-containing resin, inorganic layered compound, and liquid medium in a range that does not significantly inhibit the effect of the present invention (low oxygen permeability under high humidity). Examples of the other components include a chelate compound, and a surfactant. One type of other component may be used alone, or two or more types thereof may be used.

Production of Coating Fluid

The coating fluid of the present invention can be produced by mixing and the stirring the above-described hydroxy group-containing resin, inorganic layered compound, liquid medium, and, as necessary, other components. The mixing order of components is not particularly limited, and the coating fluid of the present invention can be produced by, for example, the following method.

1) A method including: mixing a hydroxy group-containing resin and a liquid medium, and then stirring the obtained mixture while heating the obtained mixture to produce a solution of the hydroxy group-containing resin; adding an inorganic layered compound in the obtained solution of the hydroxy group-containing resin; and stirring the obtained dispersion.

2) A method including: mixing and the stirring an inorganic layered compound and a liquid medium to produce a dispersion of the inorganic layered compound; and then mixing and stirring the obtained dispersion of the inorganic layered compound and a solution of a hydroxy group-containing resin, which has been separately produced.

3) A method including: mixing and stirring an inorganic layered compound and a liquid medium to produce a dispersion of the inorganic layered compound; adding a hydroxy group-containing resin to the obtained dispersion of the inorganic layered compound; and stirring the mixture while heating the mixture to dissolve the hydroxy group-containing resin in the dispersion.

The temperature for mixing and stirring a hydroxy group-containing resin and a liquid medium to produce a solution, or the temperature for mixing and stirring a dispersion of an inorganic layered compound and a hydroxy group-containing resin to dissolve the hydroxy group-containing resin in the dispersion is preferably 50 to 100° C., and more preferably 60 to 100° C. The stirring speed thereof is preferably 300 to 5,000 rpm, and more preferably 500 to 3,000 rpm. The peripheral velocity of stirring is preferably 1 to 8 m/min, and more preferably 2 to 6 m/min. The stirring time is preferably 10 to 120 minutes, and more preferably 20 to 110 minutes.

The temperature for mixing and stirring a solution of a hydroxy group-containing resin and an inorganic layered compound to produce a dispersion, or the temperature for mixing and stirring an inorganic layered compound and a liquid medium to produce a dispersion of the inorganic layered compound is preferably 20 to 100° C., and more preferably 30 to 80° C. The stirring speed thereof is preferably 500 to 5,000 rpm, and more preferably 1,000 to 5,000 rpm. The peripheral velocity of stirring is preferably 1 to 20 m/min, and more preferably 2 to 15 m/min. The stirring time is preferably 10 to 150 minutes, and more preferably 20 to 120 minutes.

To further enhance the dispersibility of the inorganic layered compound, the dispersion containing an inorganic layered compound is preferably subjected to high-pressure dispersion treatment using a high-pressure dispersion apparatus. Examples of the high-pressure dispersion treatment include treatments with an ultrahigh pressure homogenizer available from Microfluidics Corporation, nanomizer available from Nanomizer Inc., Manton-Gaulin high-pressure dispersion apparatus, and homogenizer available from Izumi food machinery. Herein, the high-pressure dispersion treatment is a treatment that applies a high shear and/or high pressure to a dispersion by passing the dispersion through a plurality of capillary tubes at high speed. In the method 2) or 3) described above, the dispersion before mixing the solution of the hydroxy group-containing resin or the hydroxy group-containing resin may be subjected to high-pressure dispersion treatment, or the dispersion after mixing the solution of the hydroxy group-containing resin or the hydroxy group-containing resin may be subjected to high-pressure dispersion treatment.

The diameter of capillary tube of the high-pressure dispersion apparatus is preferably 1 to 1,000 μm. The pressure of the high-pressure dispersion treatment is preferably 500 to 2,000 kgf/cm$^2$, and more preferably 1,000 to 1,800 kgf/cm$^2$. The temperature in the high-pressure dispersion treatment is preferably 10 to 50° C., and more preferably 15 to 45° C.

Coating Film and Laminate

A laminate (substrate/coating film) can be produced by applying the coating fluid of the present invention on a substrate and drying the substrate to form a coating film. It is preferred to use a coating film formed from the coating fluid of the present invention as a gas barrier layer. In other words, it is preferred to use the coating fluid of the present invention for formation of the gas barrier layer.

The laminate may have a coating film formed from the coating fluid of the present invention on only one surface thereof, or may have the coating films on both surfaces thereof. To enhance adhesion between the coating film formed from the coating fluid of the present invention and the substrate, the surface of the substrate on which the coating fluid is applied may be subjected to a surface treatment such as corona treatment, ozone treatment, electron beam treatment, and application of an anchor coating agent.

Examples of the material for the substrate include thermoplastic resins, thermosetting resins, photocurable resins, paper, wood, ceramics, and metals. Among these, thermoplastic resins are preferred. Examples of the thermoplastic resin include: olefin resins such as low density polyethylene, high density polyethylene, straight-chain low density polyethylene, an ethylene-propylene copolymer, an ethylene-butene copolymer, an ethylene-hexene copolymer, an ethylene-octene copolymer, polypropylene, poly-4-methyl pentene-1, cyclic olefin resin, an ethylene-vinyl acetate copolymer, an ethylene-methyl methacrylate copolymer, and ionomer resin; ester resins such as polyethylene terephthalate, polybutylene terephthalate, and polyethylene naphthalate; amide resins such as polyamide 6 (another name: Nylon (registered trademark) 6), polyamide 66 (another name: Nylon (registered trademark) 66), metaxylenediamine-adipic acid polycondensate, and polymethyl methacrylimide; acrylic resins such as polymethyl methacrylate; styrene resins such as polystyrene, a styrene-acrylonitrile copolymer, and a styrene-acrylonitrile-butadiene copolymer; polyacrylonitrile; cellulose resins such as cellulose triacetate, and cellulose diacetate; halogen-containing resins such as polyvinyl chloride, polyvinylidene chloride, and polyvinylidene fluoride; vinyl alcohol resins such as polyvinyl alcohol, and an ethylene-vinyl alcohol copolymer; and engineering plastics such as polycarbonate, polysulfone, polyethersulfone, polyetheretherketone, polyphenylene oxide, and polymethylene oxide.

In the present invention, the shape of the substrate is not particularly limited. Examples of the shape of the substrate include a woven fabric, a non-woven fabric, a sheet, a film, and a foam. The substrate may be a composite material. An example of the substrate of the composite material is one in which at least one selected from the group consisting of aluminium, alumina, and silica is deposited on resin.

When a thermoplastic resin film is used as the substrate, the production method of the film is not particularly limited. Examples of the film production method include extrusion, casting, a calendering method, uniaxial stretching, and biaxial stretching. The thickness of the substrate is preferably 1 to 1000 µm, and more preferably 5 to 800 µm.

The application method of the coating fluid is not particularly limited, and a publicly known method can be used. Examples of the application method include: a gravure method such as a direct gravure method, a reverse gravure method, and a micro gravure method; a roll coating method such as a double roll beat coating method, and a bottom-feed triple reverse coating method; a doctor knife method; a die coating method; a bar coating method; a dipping method; a spray coating method; a curtain coating method; a spin coating method; a flexo-coating method; a screen coating method; a coating method that uses a brush or the like.

The drying of the coating fluid that has been applied is not particularly limited, and a publicly known method can be used. Examples of drying include heat drying, drying by non-heating means such as decompression, and drying by a combination thereof. Among these, heat drying is preferably employed from the viewpoint of simplicity of an apparatus. Examples of the apparatus used for heat drying include an oven, a heating roll, an infrared ray heating apparatus, and a microwave heating apparatus. The temperature for heat drying is preferably 30 to 150° C., and more preferably 40 to 140° C. The drying time is preferably 0.01 minutes to 24 hours, and more preferably 0.01 to 60 minutes.

The thickness (thickness after drying) of the coating film formed from the coating fluid of the present invention is preferably 10 nm to 20 µm, and more preferably 20 nm to 10 µm.

In the laminate, other layer may be formed on the coating film formed from the coating fluid of the present invention. Examples of the other layer include the coating film described in Patent Literature 1 and the like, the coating film formed from a coating fluid containing an isocyanate compound, an active hydrogen compound, and polyoxycarboxylic acid.

In addition, in the laminate, other layer may be formed on a surface on which a coating film formed from the coating fluid of the present invention is formed, and/or a surface on which the coating film is not formed. Examples of the other layer include a heat seal layer, and the like. Examples of resin constituting the heat seal layer include olefin resins such as low density polyethylene, high density polyethylene, straight-chain low density polyethylene, an ethylene-propylene copolymer, an ethylene-butene copolymer, an ethylene-hexene copolymer, an ethylene-4-methyl-1-pentene copolymer, an ethylene-octene copolymer, polypropylene, an ethylene-vinyl acetate copolymer, an ethylene-methyl methacrylate copolymer, an ethylene-methyl acrylate copolymer, an ethylene-acrylic acid copolymer, and ionomer resin. To enhance adhesion between the heat seal layer and the substrate, the surface of the substrate on which the heat seal layer is formed may be subjected to a surface treatment such as corona treatment, ozone treatment, electron beam treatment, and application of an anchor coating agent.

In the laminate, a layer other than the above-described heat seal layer may be formed on a surface on which a coating film formed from the coating fluid of the present invention is formed, and/or a surface on which the coating film is not formed. Examples of resin constituting the layer other than the heat seal layer include one-part curable urethane resin, two-part curable urethane resin (for example, two-part curable urethane resin having a carbonate backbone in the main chain), silicone resin, silane resin, ester resin, epoxy resin, acrylic resin, olefin resin, fluororesin, starch, urea resin, melamine resin, phenol resin, aromatic resin, and sulfide resin.

The resin constituting the layer other than the heat seal layer is preferably at least one selected from the group consisting of two-part curable urethane resin, fluororesin, epoxy resin, and olefin resin from the viewpoint of adhesion.

One type of resin may be used alone, or two or more types of resins may be used in combination as the resin constituting the layer other than the heat seal layer. Examples of the combination of two or more types of resins include a combination of two-part curable urethane resin and silane resin, a combination of fluororesin and silane resin, a combination of epoxy resin and silane resin, and a combination of olefin resin and silane resin.

EXAMPLES

The present invention will hereinafter be described more specifically with reference to Examples, but the present invention is not limited to the following Examples. The present invention can be put into practice after appropriate modifications or variations within a range that can conform to the gist described above and below, all of which are included in the technical scope of the present invention.

1. Raw Material

Raw materials used in Examples, and the like will be described below.

(1) Hydroxy Group-Containing Resin

Hydroxy group-containing resin (1): Vinyl amine-vinyl alcohol copolymer ("Ultiloc 5003" available from Sekisui Specialty Chemicals America, LLC., random copolymer, the amount of hydroxy group per 100 g of hydroxy group-containing resin: 2 mol, the amount of amino group per 100 g of hydroxy group-containing resin: 0.27 mol, number average molecular weight: 20,000, the degree of saponification: 99%).

Hydroxy group-containing resin (2): Polyvinyl alcohol ("PVA 117H" available from Kuraray Co., Ltd., the amount of hydroxy group per 100 g of hydroxy group-containing resin: 2.26 mol, number average molecular weight: 74,800, the degree of saponification: 99.6%).

(2) Inorganic Layered Compound

High purity montmorillonite ("KUNIPIA G" available from Kunimine Industries Co., Ltd., the thickness a of unit crystal layer: 1.2156 nm)

(3) Liquid Medium

Ion exchanged water (specific electric conductance: 0.7 µs/cm or less)

Ethanol

Isopropanol

2. Characteristics Evaluation

The characteristics of the raw materials and the like used in Examples and the like were measured as follows.

(1) The Amount of Hydroxy Group and Amino Group in Hydroxy Group-Containing Resin 1) The monomer ratio of vinyl acetate-N-vinylformamide copolymer, which is a precursor, was measured by $^1$H NMR.

2) The vinyl acetate-N-vinylformamide copolymer was hydrolyzed to produce a vinylamine-vinylalcohol copolymer.

3) The residual amounts of vinyl acetate and N-vinylformamide were measured by $^1$H NMR.

4) The above-described values were converted a per 100 g basis.

(Measurement Apparatus and Condition)

$^1$H NMR apparatus (400 MHz): "Bruker Avance 400" available from Bruker

Solvent: DMSO-$d_6$
Sample concentration: 1% by mass
Measurement temperature: 25° C.
Number of scans: 16 times
D1 (delay between pulses): 0.1 seconds (2) Number Average Molecular Weight of Hydroxy Group-Containing Resin The number average molecular weight of the hydroxy group-containing resin was measured by gel permeation chromatography (GPC) with the apparatus and under the conditions described below. The results are as described above.

(Apparatus and Condition)

GPC apparatus: "Viscotek TDA 305" available from Malvern Panalytical Ltd.

Column: "SB804X2+802.5" available from SOLDEX

Sample solution: measurement sample (concentration: 1% by mass), an aqueous solution containing NaNO$_3$ (pH regulator, concentration: 0.05 M) and sodium azide (fungicide, concentration: 0.00077 M)

Detector temperature: 30° C.
Column temperature: 30° C.

(3) Average Particle Size L of Inorganic Layered Compound in Coating Fluid

The average particle size of the inorganic layered compound in the coating fluid was measured using a laser diffraction/scattering particle size distribution analyzer ("LA 910" available from Horiba, Ltd.). Specifically, the average particle size L of the inorganic layered compound in each of the coating fluids obtained in Examples and Comparative Examples described later was measured by a paste cell method under a condition of light path length of 50 μm. Further, the average particle size of the inorganic layered compound in a diluent obtained by diluting the each of the coating fluids approximately 200 times was measured by a flow cell method under a condition of light path length of 4 mm. The value of the average particle size did not change in any case. The results are described in Examples and Comparative Examples described below.

(4) Thickness a of Unit Crystal Layer of Inorganic Layered Compound

The thickness a of the unit crystal layer of the inorganic layered compound was determined by powder X-ray diffraction method using an X-ray diffractometer ("XD-5A" available from Shimadzu Corporation). The result is as described above. Additionally, the ratio L/a calculated from the average particle size L of the inorganic layered compound in the coating fluid and the unit thickness a of the inorganic layered compound is described in Examples and Comparative Examples described later.

(5) Outflow Time of Coating Fluid

The coating fluid described later was heated to 60° C., and then stirred using a propeller-type stirrer at 2,000 rpm for 20 minutes. Thereafter, the coating fluid was allowed to stand at an atmospheric temperature of 24° C. for 24 hours, thus controlling the temperature of the coating fluid to 24° C. Then, immediately before measurement of outflow time using a Zahn cup, the coating fluid was stirred at an atmospheric temperature of 24° C. using a propeller-type stirrer at 2,000 rpm for 20 minutes. Immediately after the stirring, a Zahn cup #3 (volume: 43 mL, orifice diameter: 3 mm) was immersed in the coating fluid and quickly taken out from the coating fluid. The time from the time at which the bottom of the Zahn cup was separated from the liquid surface to the time at which outflow of the coating fluid in the Zahn cup has been completed was measured. The measured outflow time (A) is shown in Tables 1 and 2.

Further, the coating fluid described later was heated to 60° C., and then stirred using a propeller-type stirrer at 2,000 rpm for 20 minutes. Thereafter, the coating fluid was allowed to stand at an atmospheric temperature of 5° C. for 24 hours, thus controlling the temperature of the coating fluid to 5° C. Then, immediately before measurement of outflow time using a Zahn cup, the coating fluid was stirred at an atmospheric temperature of 5° C. using a propeller-type stirrer at 2,000 rpm for 20 minutes. Immediately after the stirring, a Zahn cup #3 (volume: 43 mL, orifice diameter: 3 mm) was immersed in the coating fluid and quickly taken out from the coating fluid. The time from the time at which the bottom of the Zahn cup was separated from the liquid surface to the time at which outflow of the coating fluid in the Zahn cup has been completed was measured.

The outflow time (B)/outflow time (A) was calculated from the outflow time (A) and the outflow time (B) (unit: second) measured as described above. The results are shown in Tables 1 and 2.

(6) Thickness of Coating Film

The thickness of the coating film of the laminate (substrate/coating film) described later was measured by cross-sectional observation using a transmission electron microscope (TEM). Specifically, the laminate was subjected to embedding treatment with epoxy resin, and then a section was cut out with a diamond cutter. The thickness of the coating film was measured by observing the section using a TEM (manufacturer: Hitachi High-Tech Corporation, model: H-7650) at a magnification of approximately 30000 to 50000. The results are shown in Tables 1 and 2.

(7) Oxygen Permeability of Laminate

The oxygen permeability of the laminate (substrate/coating film) described later was measured under conditions of 23° C. and 80% RH using an oxygen permeability tester ("OX-TRAN ML" available from MOCON Inc.) in accordance with JIS K7126-2-2006. The results are shown in Tables 1 and 2.

3. Preparation of Coating Fluid

Example 1: Preparation of Coating Fluid (1)

First, 1300 g of ion exchanged water and 130 g of hydroxy group-containing resin (1) were charged in a dispersion machine ("DESPER MH-L" available from Asada Iron Works. Co., Ltd.), and then the temperature was raised to 95° C. while the obtained mixture was stirred at 1,500 rpm and a peripheral velocity of 4.1 m/min. The mixture was stirred at 95° C., 1,500 rpm, and a peripheral velocity of 4.1 m/min for 30 minutes, and thereby the hydroxy group-containing resin (1) was dissolved in water, after which the obtained solution was cooled to 60° C. An alcohol aqueous solution (mixture of 1170 g of ethanol and 1040 g of ion exchanged water) was added dropwise over 5 minutes to the obtained solution while the solution was stirred at 60° C., 1,500 rpm, and a peripheral velocity of 4.1 m/min. After completion of dropwise addition of the alcohol aqueous solution, 65 g of high purity montmorillonite was gradually added to the obtained mixture while the mixture was stirred at 60° C., 3,000 rpm, and a peripheral velocity of 8.2 m/min. After addition of high purity montmorillonite, the mixture was stirred at 60° C., 3,000 rpm, and a peripheral velocity of 8.2 m/min for 60 minutes. Thereafter, 1170 g of ethanol was further added to the mixture over 15 minutes, and the obtained mixture was cooled to room temperature, thus obtaining a dispersion.

The obtained dispersion was subjected to high-pressure dispersion treatment under conditions of 30° C. and 1250 kgf/cm$^2$ using a high-pressure dispersion apparatus ("ultra-high pressure homogenizer M110-E/H" available from Microfluidics Corporation, capillary tube diameter: 100 μm) to obtain a coating fluid (1) (the content of hydroxy group-containing resin (1) per 100% by mass of coating fluid (1): 2.7% by mass, the content of montmorillonite per 100% by mass of coating fluid (1): 1.3% by mass, the content of liquid medium (water and ethanol) per 100% by mass of coating fluid (1): 96% by mass, the content of ethanol per 100% by mass of total of water and ethanol: 50% by mass, the outflow time (B)/outflow time (A) of coating fluid (1): 0.99). The average particle size L of the inorganic layered compound (montmorillonite) in the coating fluid (1) was 550 nm (=0.55 μm), and the ratio L/a was 452.

Example 2: Preparation of Coating Fluid (2)

First, 1300 g of ion exchanged water and 130 g of hydroxy group-containing resin (1) were charged in a dispersion machine ("DESPER MH-L" available from Asada Iron Works. Co., Ltd.), and then the temperature was raised to 95° C. while the obtained mixture was stirred at 1,500 rpm and a peripheral velocity of 4.1 m/min. The mixture was stirred at 95° C., 1,500 rpm, and a peripheral velocity of 4.1 m/min for 30 minutes, and thereby the hydroxy group-containing resin (1) was dissolved, after which the obtained solution was cooled to 60° C. An alcohol aqueous solution (mixture of 702 g of ethanol and 1976 g of ion exchanged water) was added dropwise over 5 minutes to the obtained solution while the solution was stirred at 60° C., 1,500 rpm, and a peripheral velocity of 4.1 m/min. After completion of dropwise addition of the alcohol aqueous solution, 65 g of high purity montmorillonite was gradually added to the obtained mixture while the mixture was stirred at 60° C., 3,000 rpm, and a peripheral velocity of 8.2 m/min. After addition of high purity montmorillonite, the mixture was stirred at 60° C., 3,000 rpm, and a peripheral velocity of 8.2 m/min for 60 minutes. Thereafter, 702 g of ethanol was further added to the mixture over 15 minutes, and the obtained mixture was cooled to room temperature, thus obtaining a dispersion.

The obtained dispersion was subjected to high-pressure dispersion treatment under conditions of 30° C. and 1250 kgf/cm$^2$ using a high-pressure dispersion apparatus ("ultra-high pressure homogenizer M110-E/H" available from Microfluidics Corporation, capillary tube diameter: 100 μm) to obtain a coating fluid (2) (the content of hydroxy group-containing resin (1) per 100% by mass of coating fluid (2): 2.7% by mass, the content of montmorillonite per 100% by mass of coating fluid (2): 1.3% by mass, the content of liquid medium (water and ethanol) per 100% by mass of coating fluid (2): 96% by mass, the content of ethanol per 100% by mass of total of water and ethanol: 30% by mass, the outflow time (B)/outflow time (A) of coating fluid (2): 1.0). The average particle size L of the inorganic layered compound (montmorillonite) in the coating fluid (2) was 570 nm (=0.57 μm), and the ratio L/a was 469.

Comparative Example 1: Preparation of Coating Fluid (3)

First, 1300 g of ion exchanged water and 130 g of hydroxy group-containing resin (1) were charged in a dispersion machine ("DESPER MH-L" available from Asada Iron Works. Co., Ltd.), and then the temperature was raised to 95° C. while the obtained mixture was stirred at 1,500 rpm and a peripheral velocity of 4.1 m/min. The mixture was stirred at 95° C., 1,500 rpm, and a peripheral velocity of 4.1 m/min for 30 minutes, and thereby the hydroxy group-containing resin (1) was dissolved, after which the obtained solution was cooled to 60° C. An alcohol aqueous solution (mixture of 702 g of isopropanol and 1976 g of ion exchanged water) was added dropwise over 5 minutes to the obtained solution while the solution was stirred at 60° C., 1,500 rpm, and a peripheral velocity of 4.1 m/min. After completion of dropwise addition of the alcohol aqueous solution, 65 g of high purity montmorillonite was gradually added to the obtained mixture while the mixture was stirred at 60° C., 3,000 rpm, and a peripheral velocity of 8.2 m/min. After addition of high purity montmorillonite, the mixture was stirred at 60° C., 3,000 rpm, and a peripheral velocity of 8.2 m/min for 60 minutes. Thereafter, 702 g of isopropanol was further added to the mixture over 15 minutes, and the obtained mixture was cooled to room temperature, thus obtaining a dispersion.

The obtained dispersion was subjected to high-pressure dispersion treatment under conditions of 30° C. and 1250 kgf/cm$^2$ using a high-pressure dispersion apparatus ("ultra-high pressure homogenizer M110-E/H" available from Microfluidics Corporation, capillary tube diameter: 100 μm) to obtain a coating fluid (3) (the content of hydroxy group-containing resin (1) per 100% by mass of coating fluid (3): 2.7% by mass, the content of montmorillonite per 100% by mass of coating fluid (3): 1.3% by mass, the content of liquid medium (water and isopropanol) per 100% by mass of coating fluid (3): 96% by mass, the content of isopropanol per 100% by mass of total of water and isopropanol: 30% by mass, the outflow time (B)/outflow time (A) of coating fluid (3): 3 or more). The average particle size L of the inorganic layered compound (montmorillonite) in the coating fluid (3) was 590 nm (=0.59 μm), and the ratio L/a was 485.

Comparative Example 2: Preparation of Coating Fluid (4)

First, 936 g of ion exchanged water and 130 g of hydroxy group-containing resin (1) were charged in a dispersion machine ("DESPER MH-L" available from Asada Iron Works. Co., Ltd.), and then the temperature was raised to 95° C. while the obtained mixture was stirred at 1,500 rpm and a peripheral velocity of 4.1 m/min. The mixture was stirred at 95° C., 1,500 rpm, and a peripheral velocity of 4.1 m/min for 30 minutes, and thereby the hydroxy group-containing resin (1) was dissolved, after which the obtained solution was cooled to 60° C. Then, 1872 g of ethanol was added dropwise over 5 minutes to the obtained solution while the solution was stirred at 60° C., 1,500 rpm, and a peripheral velocity of 4.1 m/min. After completion of dropwise addition of the ethanol, 65 g of high purity montmorillonite was gradually added to the obtained mixture while the mixture was stirred at 60° C., 3,000 rpm, and a peripheral velocity of 8.2 m/min. After addition of high purity montmorillonite, the mixture was stirred at 60° C., 3,000 rpm, and a peripheral velocity of 8.2 m/min for 60 minutes. Thereafter, 1872 g of ethanol was further added to the mixture over 15 minutes, and the obtained mixture was cooled to room temperature, thus obtaining a dispersion.

The obtained dispersion was subjected to high-pressure dispersion treatment under conditions of 30° C. and 1250 kgf/cm$^2$ using a high-pressure dispersion apparatus ("ultrahigh pressure homogenizer M110-E/H" available from Microfluidics Corporation, capillary tube diameter: 100 μm) to obtain a coating fluid (4) (the content of hydroxy group-containing resin (1) per 100% by mass of coating fluid (4): 2.7% by mass, the content of montmorillonite per 100% by mass of coating fluid (4): 1.3% by mass, the content of liquid medium (water and ethanol) per 100% by mass of coating fluid (4): 96% by mass, the content of ethanol per 100% by mass of total of water and ethanol: 80% by mass, the outflow time (B)/outflow time (A) of coating fluid (4): 3 or more). The average particle size L of the inorganic layered compound (montmorillonite) in the coating fluid (4) was 530 nm (=0.53 μm), and the ratio L/a was 436.

Comparative Example 3: Preparation of Coating Fluid (5)

A coating fluid (5) was obtained in the same manner as in Example 2 except for using the hydroxy group-containing resin (2) in place of the hydroxy group-containing resin (1) (the content of hydroxy group-containing resin (2) per 100% by mass of coating fluid (5): 2.7% by mass, the content of montmorillonite per 100% by mass of coating fluid (5): 1.3% by mass, the content of liquid medium (water and ethanol) per 100% by mass of coating fluid (5): 96% by mass, the content of ethanol per 100% by mass of total of water and ethanol: 30% by mass, the outflow time (B)/outflow time (A) of coating fluid (5): 1.5).

Comparative Example 4: Preparation of Coating Fluid (6)

A coating fluid (6) was obtained in the same manner as in Comparative Example 1 except for using the hydroxy group-containing resin (2) in place of the hydroxy group-containing resin (1) (the content of hydroxy group-containing resin (2) per 100% by mass of coating fluid (6): 2.7% by mass, the content of montmorillonite per 100% by mass of coating fluid (6): 1.3% by mass, the content of liquid medium (water and isopropanol) per 100% by mass of coating fluid (6): 96% by mass, the content of isopropanol per 100% by mass of total of water and isopropanol: 30% by mass, the outflow time (B)/outflow time (A) of coating fluid (3): 1.6). The average particle size L of the inorganic layered compound (montmorillonite) in the coating fluid (6) was 560 nm (=0.56 μm), and the ratio L/a was 461.

Example 3: Preparation of Coating Fluid (7)

First, 1100 g of ion exchanged water and 200 g of ethanol were charged in a dispersion machine ("DESPER MH-L" available from Asada Iron Works. Co., Ltd.), and the aqueous solution was stirred at 30° C., 3,000 rpm, and a peripheral velocity of 8.2 m/min for 5 minutes. Then, 65 g of high purity montmorillonite was gradually added to the obtained aqueous solution while the aqueous solution was stirred at 30° C., 3,000 rpm, and a peripheral velocity of 8.2 m/min. After addition of high purity montmorillonite, the mixture was stirred at 30° C., 3,000 rpm, and a peripheral velocity of 8.2 m/min for 60 minutes, and then subjected to high-pressure dispersion treatment under conditions of 30° C. and 1250 kgf/cm$^2$ using a high-pressure dispersion apparatus ("ultrahigh pressure homogenizer M110-E/H" available from Microfluidics Corporation, capillary tube diameter: 100 μm) to obtain a dispersion A.

Next, 476.7 g of ion exchanged water and 130 g of hydroxy group-containing resin (1) were charged in a dispersion machine ("DESPER MH-L" available from Asada Iron Works. Co., Ltd.), and then the temperature was raised to 95° C. while the obtained mixture was stirred at 1,500 rpm and a peripheral velocity of 4.1 m/min. The mixture was stirred at 95° C., 1,500 rpm, and a peripheral velocity of 4.1 m/min for 30 minutes, and thereby the hydroxy group-containing resin (1) was dissolved, after which the obtained solution was cooled to 60° C. Then, 433.3 g of ethanol was added dropwise to the obtained solution over 5 minutes while the solution was stirred at 60° C., 1,500 rpm, and a peripheral velocity of 4.1 m/min. The obtained mixture was cooled to room temperature, thus obtaining a solution B.

The obtained dispersion A was gradually added to the solution B while the solution B was stirred at 60° C., 3,000 rpm, and a peripheral velocity of 8.2 m/min, and then the obtained mixture was stirred for 30 minutes. Thereafter, 42.4 g of ethanol was further added to the mixture over 5 minutes, and the obtained mixture was stirred for 10 minutes. The mixture was cooled to room temperature, and thereby a dispersion C was obtained.

The obtained dispersion C was subjected to high-pressure dispersion treatment under conditions of 30° C. and 1250 kgf/cm$^2$ using a high-pressure dispersion apparatus ("ultrahigh pressure homogenizer M110-E/H" available from Microfluidics Corporation, capillary tube diameter: 100 μm) to obtain a coating fluid (7) (the content of hydroxy group-containing resin (1) per 100% by mass of coating fluid (7): 5.3% by mass, the content of montmorillonite per 100% by mass of coating fluid (7): 2.7% by mass, the content of liquid medium (water and ethanol) per 100% by mass of coating fluid (7): 92% by mass, the content of ethanol per 100% by mass of total of water and ethanol: 30% by mass, the outflow time (B)/outflow time (A) of coating fluid (7): 1.3). The average particle size L of the inorganic layered compound (montmorillonite) in the coating fluid (7) was 448 nm (=0.448 µm), and the ratio L/a was 369.

4. Preparation of Coating Film and Laminate

Laminates were obtained by applying respective coating fluids (1) to (6) obtained in Examples 1 and 2, and Comparative Examples 1 to 4 to substrates as follows. A straight-chain low density polyethylene film ("TUX-FCD" available from Mitsui Chemicals Tohcello Inc.) with a thickness of 40 µm, whose one surface has been subjected to corona treatment, was used as the substrate. A laminate (substrate/coating film) was obtained by applying any one of coating fluids (1) to (6) to the surface of the substrate subjected to corona treatment using a direct gravure printing machine and a helio plate (lines per inch: 250) under a condition of a coating speed of 30 m/min, followed by drying using an oven at a drying temperature of 60° C. for 20 minutes to form a coating film on the substrate. The thickness of the coating film after drying and the oxygen permeability of the obtained laminate were measured as described above. The results are shown in Table 1. Further, the alcohol used for preparation of the coating fluid, the content of the alcohol, the type of hydroxy group-containing resin, the outflow time (A) of the coating fluid, and the ratio of outflow time (B)/outflow time (A) are also shown in Table 1.

A laminate was obtained by applying the coating fluid (7) obtained in Example 3 to the substrate as follows. A polyester film ("EMBLET PTM" available from Unitika Ltd.) with a thickness of 12 µm, whose one surface has been subjected to corona treatment, was used as the substrate. A laminate (substrate/coating film) was obtained by applying the coating fluid (7) to the surface of the substrate subjected to corona treatment using a direct gravure printing machine and a helio plate (lines per inch: 137) under a condition of a coating speed of 30 m/min, followed by drying using an oven at a drying temperature of 60° C. for 20 minutes to form a coating film on the substrate. The thickness of the coating film after drying and the oxygen permeability of the obtained laminate were measured as described above. The results are shown in Table 2. Further, the alcohol used for preparation of the coating fluid, the content of the alcohol, the type of hydroxy group-containing resin, the outflow time (A) of the coating fluid, and the ratio of outflow time (B)/outflow time (A) are also shown in Table 2.

TABLE 1

| | Type of coating fluid | Alcohol Type | Content*1 (% by mass) | Type of hydroxy group-containing resin | Outflow time (A) (second) | (B)/(A)*2 | Thickness of coating film (µm) | Oxygen permeability (cc/m² · day · atm) |
|---|---|---|---|---|---|---|---|---|
| Example 1 | (1) | Ethanol | 50 | (1) | 9.6 | 0.99 | 0.05 | 58 |
| Example 2 | (2) | Ethanol | 30 | (1) | 9.2 | 1.0 | 0.05 | 65 |
| Comparative Example 1 | (3) | Isopropanol | 30 | (1) | 11.2 | >3 | 0.05 | >300 |
| Comparative Example 2 | (4) | Ethanol | 80 | (1) | 15.3 | >3 | 0.05 | >300 |
| Comparative Example 3 | (5) | Ethanol | 30 | (2) | 11.5 | 1.5 | 0.05 | 135 |
| Comparative Example 4 | (6) | Isopropanol | 30 | (2) | 11.2 | 1.6 | 0.05 | 120 |

(Note)
*1 Alcohol content = alcohol content per 100% by mass of total of water and alcohol
*2 (B)/(A) = outflow time (B)/outflow time (A)
Substrate used = 40 µm-thick straight-chain low density polyethylene film

TABLE 2

| | Type of coating fluid | Alcohol Type | Content*1 (% by mass) | Type of hydroxy group-containing resin | Outflow time (A) (second) | (B)/(A)*2 | Thickness of coating film (µm) | Oxygen permeability (cc/m² · day · atm) |
|---|---|---|---|---|---|---|---|---|
| Example 3 | (7) | Ethanol | 30 | (1) | 67.0 | 1.3 | 0.10 | 76 |

(Note)
*1 Alcohol content = alcohol content per 100% by mass of total of water and alcohol
*2 (B)/(A) = outflow time (B)/outflow time (A)
Substrate used = 12 µm-thick polyester film As shown in the result of Table 1, laminates (substrate/coating film) formed from the coating fluids of Examples 1 and 2, in which the outflow time (B)/outflow time (A) is 1.40 or less, have low oxygen permeability under high humidity (80% RH) compared to laminates formed from the coating fluids of Comparative Examples 1 to 4, in which the outflow time (B)/outflow time (A) exceeds 1.40.

As shown in the result of Table 2, even in the case of using a substrate that is different from the substrates of Examples 1 and 2, and Comparative Examples 1 to 4 and changing the thickness of the coating film, oxygen permeability under high humidity (80% RH) can be reduced by setting the outflow time (B)/outflow time (A) to be 1.40 or less.

INDUSTRIAL APPLICABILITY

A gas barrier layer (coating film) exhibiting low oxygen permeability under high humidity can be formed from the coating fluid of the present invention. A laminate, in which the above-described coating film is formed on a substrate, is useful as packaging materials for foods, cosmetics or the like.

The present application claims priority on JP-2017-215033, and the entire contents of all of which are incorporated herein by reference.

The invention claimed is:

1. A coating fluid, comprising:
a hydroxy group-containing resin that comprises a hydroxy group and an amino group;
an inorganic layered compound; and
a liquid medium, wherein
a ratio (outflow time (B)/outflow time (A)) of outflow time (B) of a coating fluid at 5° C. measured by a Zahn cup to outflow time (A) of a coating fluid at 24° C. measured by a Zahn cup is 1.40 or less, wherein a number average molecular weight of the hydroxy group-containing resin is 10,000 to 50,000.

2. The coating fluid according to claim 1, wherein the outflow time (B)/outflow time (A) is 1.30 or less.

3. The coating fluid according to claim 1, wherein an amount of a hydroxy group per 100 g of the hydroxy group-containing resin is 1.50 to 2.27 mol.

4. The coating fluid according to claim 1, wherein an amount of the amino group per 100 g of the hydroxy group-containing resin is 0.046 to 0.682 mol.

5. The coating fluid according to claim 1, wherein the hydroxy group-containing resin is a vinylamine-vinylalcohol copolymer.

6. The coating fluid according to claim 1, wherein a content of the hydroxy group-containing resin is 0.2 to 9.05% by mass per 100% by mass of the coating fluid.

7. The coating fluid according to claim 1, wherein the liquid medium contains water and ethanol.

8. The coating fluid according to claim 7, wherein a content of ethanol is 1 to 70% by mass per 100% by mass of the total of water and ethanol.

9. The coating fluid according to claim 1, wherein a content of the liquid medium is 90 to 99.5% by mass per 100% by mass of the coating fluid.

10. The coating fluid according to claim 1, wherein an average particle size of the inorganic layered compound in the coating fluid is 0.02 to 3 μm.

11. The coating fluid according to claim 1, wherein a ratio (L/a) of an average particle size L of the inorganic layered compound in the coating fluid to a thickness a of a unit crystal layer of an inorganic layered compound measured by powder X-ray diffraction method is 20 to 3,000.

12. The coating fluid according to claim 1, wherein the inorganic layered compound is montmorillonite.

13. The coating fluid according to claim 1, wherein a content of the inorganic layered compound is 0.047 to 6.0% by mass per 100% by mass of the coating fluid.

14. The coating fluid according to claim 1, wherein a content of the inorganic layered compound is 0.047 to 5.0% by mass per 100% by mass of the coating fluid.

15. The coating fluid according to claim 4, wherein the liquid medium contains water and ethanol.

16. The coating fluid according to claim 15, wherein a content of the ethanol is 10 to 50% by mass per 100% by mass of the total of water and ethanol.

17. The coating fluid according to claim 5, wherein the liquid medium contains water and ethanol.

18. The coating fluid according to claim 17, wherein a content of the ethanol is 10 to 50% by mass per 100% by mass of the total of water and ethanol.

19. The coating fluid according to claim 7, wherein a content of the ethanol is 10 to 50% by mass per 100% by mass of the total of water and ethanol.

* * * * *